United States Patent [19]
Engle

[11] Patent Number: 5,760,755
[45] Date of Patent: Jun. 2, 1998

[54] ELECTROSTATIC LIGHT VALVE SYSTEM CONFIGURATIONS

[76] Inventor: Craig D. Engle, 336 Cline Ave., Griffith, Ind. 46319

[21] Appl. No.: 515,808

[22] Filed: Aug. 16, 1995

[51] Int. Cl.⁶ ......................................................... G09G 3/34
[52] U.S. Cl. ................... 345/85; 345/84; 359/292
[58] Field of Search ............................... 345/84, 85, 108; 359/292, 295, 279, 290, 291

[56] References Cited

U.S. PATENT DOCUMENTS

| | | | |
|---|---|---|---|
| 4,087,810 | 5/1978 | Hung et al. | 345/206 |
| 4,622,590 | 11/1986 | Togashi | 348/792 |
| 4,631,551 | 12/1986 | Vergona | 347/232 |
| 4,667,256 | 5/1987 | Vergona | 358/302 |
| 5,612,713 | 3/1997 | Bhuva et al. | 345/84 |

OTHER PUBLICATIONS

L. S. Cosentino and W. C. Stewart, A Membrane Page Composer, RCA Review, vol. 34, Mar. 1973.

Yong S. Lee and Kensall D. Wise, A Batch–Fabricated Silicon Capacitive Pressure Transducer with Low Temperature Sensitivity, IEEE Transactions on Electron Devices, vol. ED–29, No. 1, Jan. 1982.

Dean R. Harrison and John Dimeff, A diode–Quad Bridge Circuit for Use with Capacitance Transducers, Rev. Sci. Instrum., vol. 44, No. 10, Oct. 1973.

P. D. Atherton, et al, An Infinitely Stiff Very High Precisison Actuator, SPIE vol. 803, Micromachining of Elements with Optical & other Submicrometer Dimensional & Surface Specficiations.

R. E. Newnham et al, Smart Ceramics, Ferroelectrics, 1990, vol. 102, pp. 259–266.

Primary Examiner—Steven Saras
Assistant Examiner—Xu-Ming Wu

[57] ABSTRACT

A reflective deformable conductor (40) is separated from a transmissive electrode (60) to form a capacitance transducer (C2) and separated from a second electrode (18) to form a modulator pixel (66). The pixel (66) and transducer (C2) are series coupled capacitors. Transmissive electrode (60) and deformable conductor (40) are electrically connected to a feedback control loop (68) which sums an input signal and a negative feedback signal related to the deformations of conductor (40) to control the potential difference applied between the second electrode (18) and the conductor (40). Varying the input signal varies the deformation of the conductor (40) thereby phase modulating a wavefront incident on the transmissive electrode (60) traversing the capacitance transducer (C2) to impinge on and be reflected by the conductor (40) and exit the transducer (C2).

20 Claims, 4 Drawing Sheets

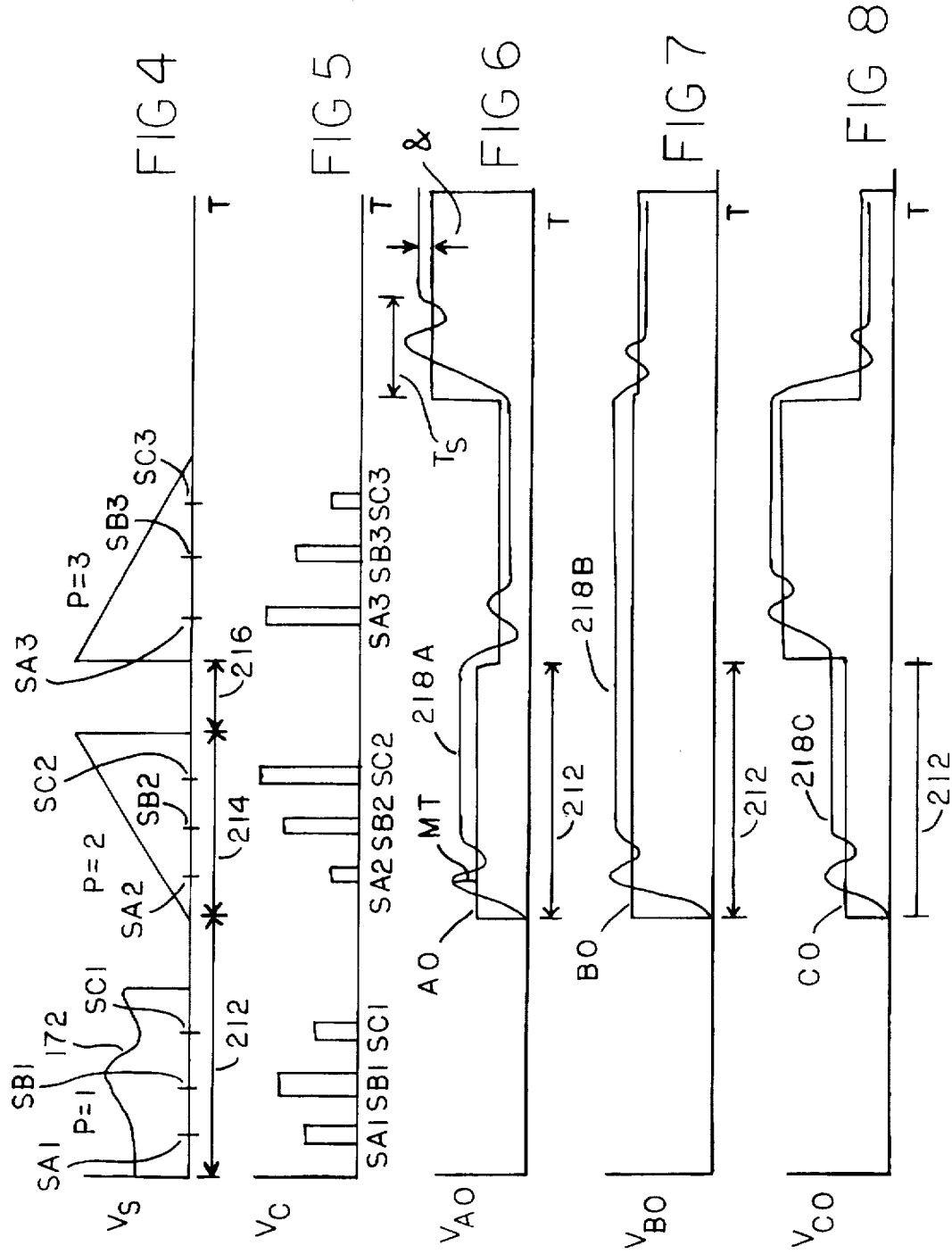

ELECTROSTATIC LIGHT VALVE SYSTEM CONFIGURATIONS

BACKGROUND: FIELD OF INVENTION

This invention relates to smart system interfaces for use with electrostatic spatial light modulators.

BACKGROUND: PRIOR ART

Several color display applications, which involves hard copy output devices and visual display devices, require light emitting elements operational in various spectral bands. As well understood by those knowledgeable in the state of the art, solid state light emitting elements exhibit dependencies on the spectral region of operation. Development of solid state light emitting devices which would allow controlled emissions to be achieved in each of the three primary color bands typically associated with color applications has been hampered by such dependencies.

Reflective surface deformation type spatial light modulators offer an alternative to the material development problems associated with solid state light emissive devices. Reflective electrostatic light modulators have an intrinsic capability to exhibit a broad spectral response, thereby exhibiting a desirable feature for use in display applications, including color display applications. Accordingly, a need exists for reflective surface deformation type electrostatic light modulator systems.

OBJECTS AND ADVANTAGES

Accordingly, several objects and advantages of my invention are:

1) To identify several types of feedback transducers which are compatible with reflective surface deformation type spatial light modulators.
2) To identify the benefits of utilizing feedback in spatial light modulator systems.
3) To identify electrostatic spatial light modulator system configurations which provides a feedback loop for each pixel element of the modulator.

Further objects and advantages of my invention will become apparent from a consideration of the drawings and ensuing description of it.

DESCRIPTION OF FIGURES

In the drawings, closely related figures have the sane number but different alphabetic suffices.

FIG. 4 shows a timing diagram associated with an electrostatic spatial light modulator system utilizing an electro-optic feedback mechanism.

FIG. 5 shows a timing diagram associated with an electrostatic spatial light modulator system utilizing an electro-optic feedback mechanism.

FIG. 6 shows a timing diagram associated with an electrostatic spatial light modulator system utilizing an electro-optic feedback mechanism.

FIG. 7 shows a timing diagram associated with an electrostatic spatial light modulator system utilizing an electro-optic feedback mechanism.

FIG. 8 shows a timing diagram associated with an electrostatic spatial light modulator system utilizing an electro-optic feedback mechanism.

DESCRIPTION OF INVENTION

Figure 1:
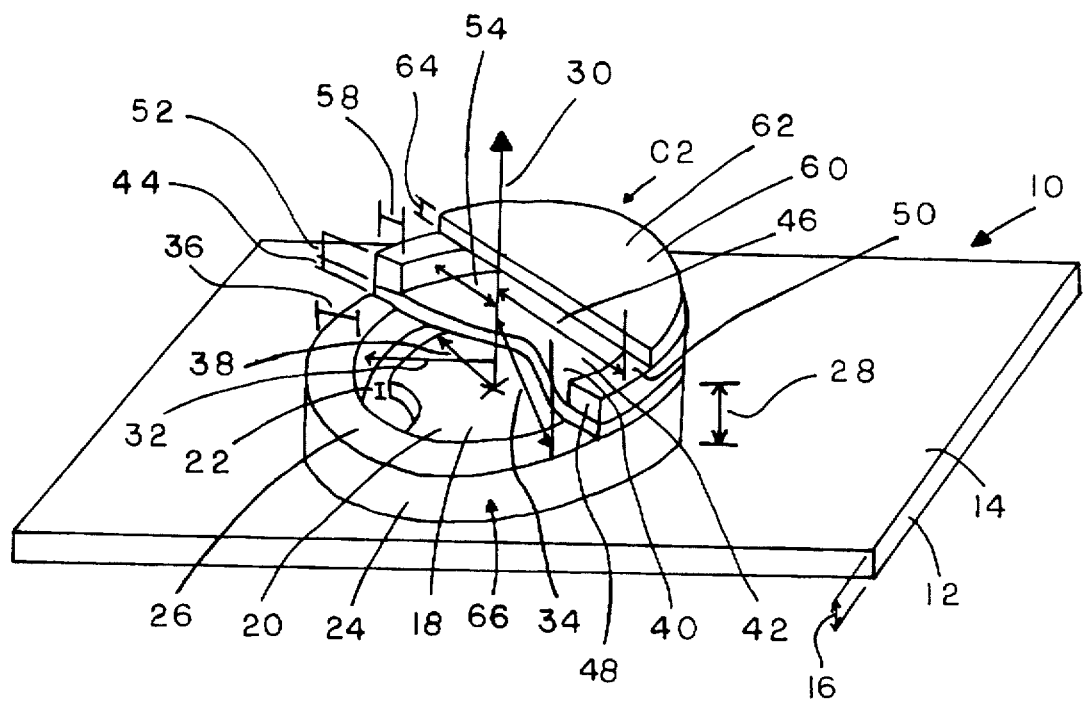
FIG. 1 shows a single element membrane light modulator electrically and mechanically associated with a capacitance transducer.

FIG. 1 shows a single element smart membrane light modulator 10. Portions of figure have been shown cutaway for clarity. Modulator 10 further includes a substrate 12. Substrate 12 further includes a first substrate surface 14 and a second substrate surface. The second substrate surface is not visible in the figure. Surface 14 and the second surface of substrate 12 are essentially parallel planes separated by a substrate thickness 16. Thickness 16 is perpendicular to surface 14.

Affixed to surface 14 is a first electrode 18. Electrode 18 further includes a first electrode surface 20 and a second surface. The second surface of electrode 18 is not visible in the figure. Surface 20 and the second surface of electrode 18 are essentially parallel planes separated by an electrode thickness 22. Thickness 22 is perpendicular to surface 20 and parallel to thickness 16.

Surrounding electrode 18 is a insulating cylindrical ring 24. Ring 24 further includes a crown surface 26 and a second crown surface. The second crown surface of ring 24 is not visible in the figure. Surface 26 and the second crown surface of ring 24 are essentially parallel planes separated by a ring height 28. Height 28 is perpendicular to surface 26 and parallel to thickness 16.

Ring 24 further includes a center line axis 30. Axis 30 is parallel to thickness 16. Ring 24 further includes a inside radius 32 and an outside radius 34. The difference between radius 34 and radius 32 yields a ring wall thickness 36. Thickness 36 is perpendicular to thickness 16. Electrode 18 is circular in shape and posses a cross-sectional radius 38. Radius 38 is perpendicular to thickness 16.

Affixed to surface 26 is reflective deformable conductor 40. Conductor 40 further includes a first reflective surface 42 and a second surface. The second surface of conductor 40 is not visible in the figure. Conductor 40 is shown in an undeformed state. In an undeformed state, surface 42 and the second surface of conductor 40 are essentially parallel planes separated by a conductor thickness 44. Conductor 40 possess a cross-sectional radius 46. Radius 46 is perpendicular to thickness 16.

Affixed to surface 42 is a second insulating cylindrical ring 48. Ring 48 further includes a first crown surface 50 and a second crown surface. The second crown surface of ring 48 is not visible in the figure. Surface 50 and the second crown surface are essentially parallel planes separated by a ring thickness 52. Thickness 52 is perpendicular to surface 50 and parallel to thickness 16. Axis 30 is the axis of revolution of ring 48. Ring 48 further includes an inside radius 54 and an outside radius. The outside radius of ring 48 is equal to radius 46.

The difference between radius 46 and radius 54 yields a ring wall thickness 58. Thickness 58 is perpendicular to thickness 16.

Affixed to surface 50 is a transmissive rigid conductive window 60. Conductive window 60 further includes a first surface 62 and a second surface. The second surface of conductive window 60 is not visible in the figure. Surface 62 and the second surface of window 60 are essentially parallel planes separated by a window thickness 64. Thickness 64 is perpendicular to surface 62 and parallel to thickness 16. Alternatively, the window would be an insulating transmissive glass substrate with a transparent conductive electrode affixed to the second surface of the window. Suitable conductors include indium tin oxide. Conducting transmissive materials for use as the window in my invention are well understood by those knowledgeable in the state of the art.

Separating electrode 18 from conductor 40 by the use of ring 24 establishes an electrostatic capacitive pixel 66. Separating conductor 40 from conductive window 60 by the use of ring 48 establishes a feedback capacitance transducer element C2. As to be explained herein, C2 is utilized to generate a feedback signal related to the state of deformation of conductor 40. The feedback signal is utilized to enhance the control of the deformations of conductor 40.

As well understood by those knowledgeable in the state of the art, varying a potential difference applied between electrode 18 and conductor 40 will vary an electric field in pixel 66 which will vary electrostatic forces applied to the conductor 40 which leads to variations in the deformation of conductor 40 thereby phase modulating a wavefront incident on conductor 40. The wavefront and means for applying a potential difference to pixel 66 are not shown in the figure.

Deformation behavior of conductor 40, due to potential differences applied between electrode 18 and conductor 40 are well understood by those knowledgeable in the state of the art. See for instance information in U.S. Pat. No. 4,087,810 to Hung et al, May 2, 1978 and information in the article titled "A Membrane Page Composer" by L. S. Cosentino and W. C. Stewart, RCA Review, Vol. 34, March 1973.

Determination of capacitance values for pixel 66 and element C2 are well understood by those knowledgeable in the state of the art. See for instance information contained in the article titled "A Batch-Fabricated Silicon Capacitance Pressure Transducer with Low Temperature Sensitivity" by Young S. Lee et al, IEEE Transactions of Electron Devices, Vol. ED-29, No. 1, January 1982. Values for the dielectric constants associated with pixel 66 and transducer C2 are well understood by those knowledgeable in the state of the art. Equation 1 shown below identifies the relationship involving the change in capacitance of capacitor C2 due to deformation of conductor 40.

$$\&C = C - Co = C - eA/d \quad (1)$$

Where

&C is defined as the change in capacitance of capacitor C2 due to variations in the deformation of conductor 40 which are attributed to the potential difference applied to conductor 40 and electrode 18 of pixel 66.

Co is defined as the capacitance of capacitor C2 when conductor 40 is in an undeformed state.

e is defined as the dielectric constant of the medium confined between conductor 40 and window 60 of capacitor C2.

A is defined as the area of the capacitor electrode plates conductor 40 and window 60. Given the radius measure as identified in figure, determination of the area of conductor 40 and window 60 of capacitor transducer element C2 is well understood by those knowledgeable in the state of the art.

d is defined as the separation distance between conductor 40 and window 60 when conductor 40 is in an undeformed state, therefor d is equal to ring thickness 52.

C is defined as the capacitance value of capacitor C2 when conductor 40 is in a deformed state. Utilizing the information proved herein, determination of C as a function of the deformation of conductor 40, and therefor the potential difference between electrode 18 and conductor 40, is understood by those knowledgeable by the state of the art.

Due to the nature of the electrostatic forces which deform the conductor of the pixel element, the conductor will be deformed in a manner which results in increasing the separation distance between the conductor and window of the capacitance transducer. Several techniques exist to generate an electrical signal output related to the modulations of the capacitance values of transducer C2 due to varying deformations of conductor 40. A particularly simple scheme which is utilizable with my invention is described in the article titled "A Diode-Quad Bridge Circuit for Use with Capacitance Transducers", by Dean R. Harrison and John Dimeff, Rev. Sci. Instrum, Vol. 44, No. 10, October 1973.

Figure 2:
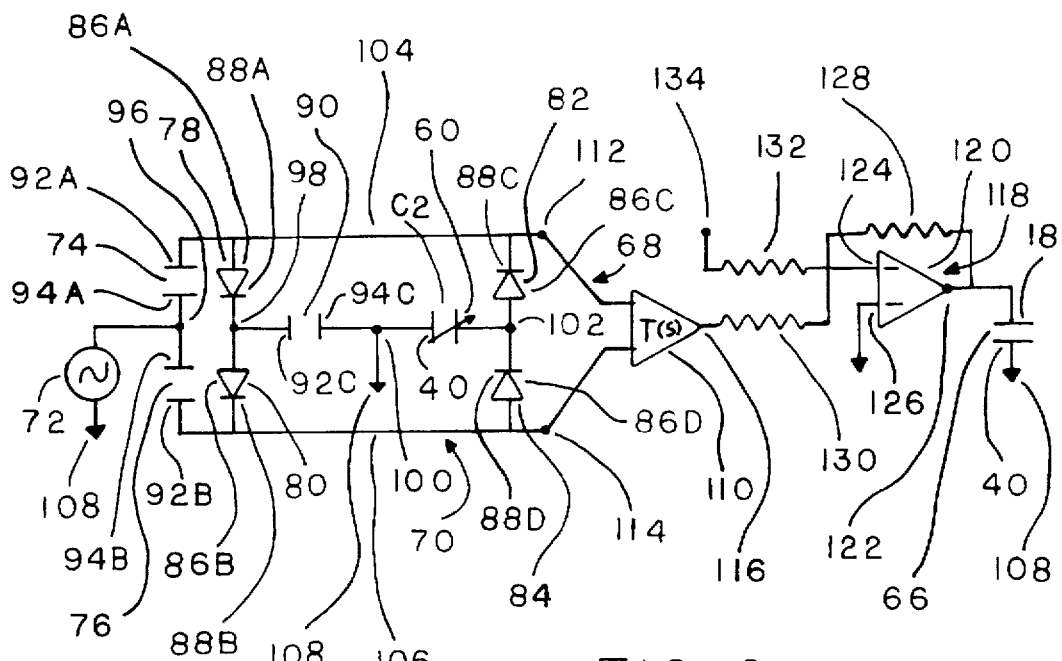
FIG. 2 shows a control system loop for use with a capacitance transducer feedback interface in an electrostatic spatial light modulator system.

FIG. 2 shows a feedback control loop 68 which is compatible with my invention. Loop 68 utilizes the diode bridge circuit identified in the above cited reference to provide a feedback signal for enhancing the control of the deformation of the deformable conductor. Loop 68 further includes a feedback circuit 70. Circuit 70 further includes an excitation voltage source 72, a first coupling capacitor 74, and a second coupling capacitor 76. Circuit 70 further includes a first diode 78, a second diode 80, a third diode 82 and a fourth diode 84. Each diode further includes an anode terminal 86 and a cathode terminal 88. Circuit 70 further includes a balanced capacitor 90.

Capacitor 74, capacitor 76 and capacitor 90 further include a first capacitor terminal 92 and a second capacitor terminal 94. Circuit 70 further includes a first electrical junction 96, a second electrical junction 98, a third electrical junction 100, a fourth electrical junction 102, a first buss 104 and a second buss 106. Source 72 is electrically connected between junction 96 and a ground terminal 108.

Electrically connected to buss 104 is terminal 92 of capacitor 74, anode terminal 86 of diode 78, and cathode terminal 88 of diode 82. Electrically connected to buss 106 is terminal 92 of capacitor 76, cathode terminal 88 of diode 80, and anode terminal 86 of diode 84.

Electrically connected to junction 96 is terminal 94 of capacitor 74 and terminal 94 of capacitor 76. Electrically connected to junction 98 is cathode terminal 88 of diode 78 and anode terminal 86 of diode 80 and terminal 92 of capacitor 90.

Electrically connected to junction 100 is terminal 94 of capacitor 90 and conductor 40 of capacitor C2. Junction 100 is electrically connected to ground terminal 108. Electrically connected to junction 102 is anode terminal 86 of diode 82, cathode terminal 88 of diode 84 and window 60 of capacitor C2. Note: balance capacitor 90 is not to be confused with the modulation pixel capacitor.

Operation of circuit 70 is fully described in the cited reference. Circuit 70 further includes a differential input, single output, feedback amplifier 110. Buss 104 is electrically connected to a first input terminal 112 and buss 106 is electrically connected to a second input terminal 114 of amplifier 110. Amplifier 110 further includes an output terminal 116. Relationships involving the feedback control signal present on terminal 116 and the signals present on terminals 112 and terminal 114 of amplifier 110 are determined by the transfer function T(s) of amplifier 110. Synthesis of a transfer functions utilizable in differential to single ended amplifiers for use in a feedback control systems involving motion sensing are well understood by those knowledgeable in the state of the art. See for instance information in U.S. Pat. No. 4,667,256 to Vergona, May 19, 1987 and information in the articles titled "An Infinitely Stiff Very High Precision Actuator" by P. D. Atherton et al. SPIE Vol 803, 1987 and "Smart Ceramics" by R. E. Newnham et al. Ferroelectrics, 1990, Vol. 102.

Loop 68 further includes a summing operational amplifier 118. Amplifier 118 further includes an operational amplifier 120. Amplifier 120 further includes an output terminal 122, a minus terminal 124 and a positive terminal 126. Electrically connected between terminal 122 and terminal 124 is a feedback impedance element 128. Electrically connected between terminal 124 and output terminal 116 of amplifier 110 is a feedback input impedance element 130. An input impedance element 132 is electrically connected between terminal 124 and an input drive terminal 134. Summing amplifier configurations and the transfer function associated with such amplifiers are well understood by those knowledgeable in the state of the art, and no detailed explanation is needed of the transfer function which describes the relationship involving the output signal present at terminal 122 of amplifier 120 and the input signal present at input terminal 134 and the feedback signal present on the output terminal 116 of amplifier 110.

Output terminal 122 is electrically connected to electrode 18 of pixel 66. Conductor 40 of pixel 66 is electrically connected to ground terminal 108. Since conductor 40 is common to both pixel 66 and capacitor C2, conductor 40 is shown in two locations in the schematic representation of my invention in FIG. 2 for convenience.

Varying an input signal applied to terminal 134 will vary the potential difference of pixel 66 which varies an electric field in pixel 66 which varies the electrostatic forces applied to conductor 40 which leads to variations in the deformation of conductor 40, thereby phase modulating a wavefront incident thereon. The wavefront, electric field and electrostatic forces are not shown in the figure for convenience. Such considerations are well understood by those knowledgeable in the state of the art. Due to circuit 70 utilizing capacitor C2, the capacitance value of C2 varies as a function of the deformation associated with conductor 40. Circuit 70 processes the capacitance variations to generate a negative feedback signal available at the output terminal 116 of amplifier 110.

Due to the configurations of loop 68, the feedback signal present at terminal 116 is summed, with negative feedback, with the input signal present at terminal 134 to enhance control of the deformations of conductor 40. This enhances control of the phase modulations of a wavefront which is incident on window 60, traverses C2 and is incident on and reflected by conductor 40 to again traverse C2 and exit the modulator. System considerations, such as the polarity of the feedback signal relative to the input signal, to ensure negative feedback for stability considerations of loop 68, are well understood by those knowledgeable in the state of the art. Such considerations will influence the transfer function of amplifier 110 and synthesis of the amplifier 110. Alternatives for summing the feedback signal with the input signal to establish a negative feedback loop includes alternative designs of the summing amplifier. Such considerations are well understood by those knowledgeable in the art.

Several benefits are available with my invention. Due to utilizing a reflective surface deformation type electrostatic light modulator, a broad spectral response is inherent with my invention. Utilization of a feedback control loop to vary the deformations of the light modulator enhances control of the deformations, thereby enhancing the phase modulation capability of the wavefront. These benefits facilitate enhancements in display applications including laser printing, film printing, and visual display applications. Response characteristics which are capable of being influenced by the closed loop feedback system of my invention include the transient response of the conductor deformation, damping characteristics, and steady state error.

As identified in the references cited herein, deformation of conductor 40 in FIG. 2 of my invention will posses a characteristic response time dependent on the boundary conditions associated with the geometry of conductor 40. One of the benefits of my invention is the relative lack of sensitivity of circuit 70 to the frequency of source 72. Therefore, I believe it is beneficial to select the frequency of oscillations associated with the waveform generated by source 72 to be greater than the response capabilities of conductor 40. Such a consideration reduces undesirable influences of capacitor C2 on the operation of pixel 66. The waveform generated by source 72 is not shown in the figure. Furthermore, to reduce the average force component applied on conductor 40 due to the high frequency waveform applied to the capacitance transducer C2, the duty cycle of the waveform generated by source 72 is selected to reduce the average value of the force component on conductor 40 due to transducer C2.

Additional considerations involved in the operation of my invention, due to the latitude inherent in my invention includes purging and filling of element C2 and pixel 66 with an inert gas. The pressure of the gas in pixel 66 and element C2 could be selected to influence damping and/or cancellation of D. C. positional offsets of conductor 40 due to operation of element C2.

Use of a capacitance transducer in the feedback loop of my invention offers several advantages over prior art which utilizes a beam splitter to sample the modulated wavefront. Use of a beam splitter reduces the amplitude of the modulated wavefront, adversely effecting efficiency.

Figure 3:
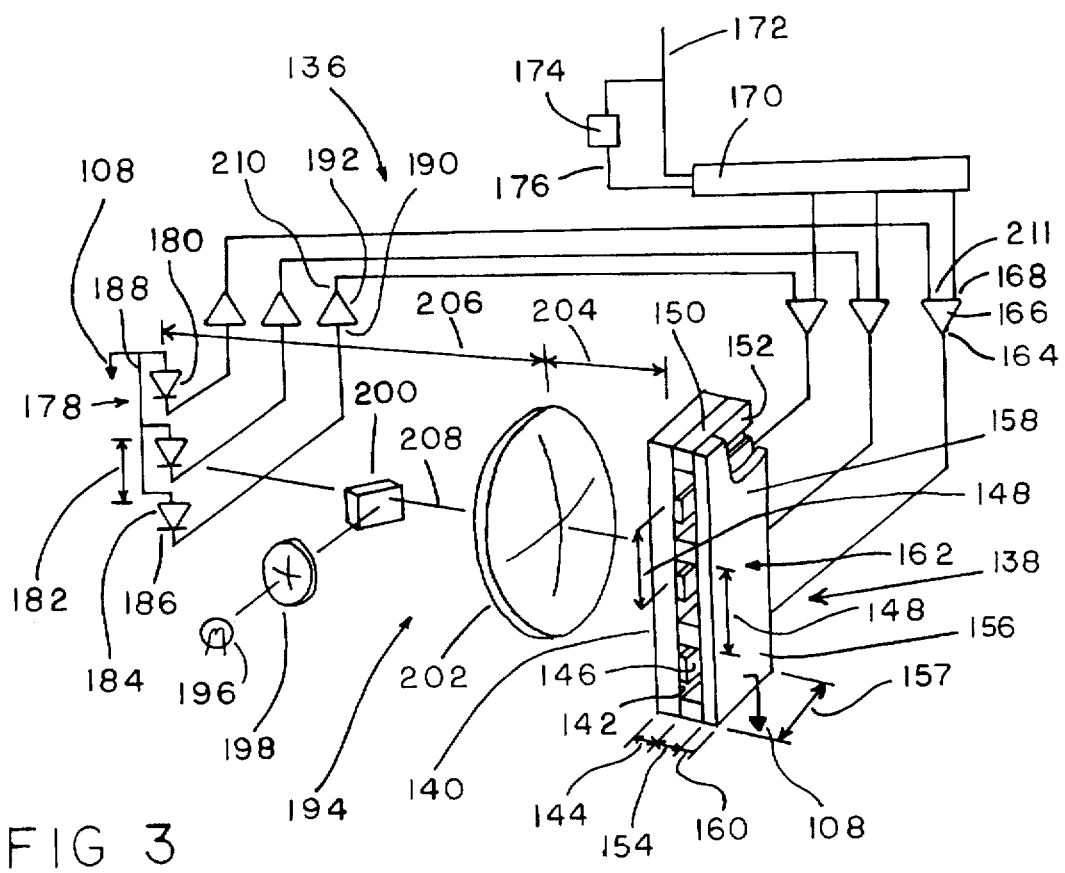
FIG. 3 shows a linear electrostatic light modulator array interfaced with an electro-optic feedback sensing mechanism.

FIG. 3 shows a smart electro-optic modulator system 136. FIG. 3 has not been drawn to scale for convenience. System 136 further includes a linear membrane modulator array 138. Array 138 further includes a transmissive insulating substrate 140. Substrate 140 further includes a first surface 142 and a second surface. The second surface of substrate 140 is not visible in the figure. Surface 142 and the second surface are essentially parallel planes separated by a substrate thickness 144. Thickness 144 is perpendicular to surface 144.

Affixed to surface 142 is a plurality of transmissive electrodes 146. Materials utilizable for transmissive electrodes includes indium tin oxide. Adjacent electrodes 146 are displaced by a first period 148. Period 148 is perpendicular to thickness 144. Affixed to surface 142 is a plurality of ridges 150. Adjacent ridges 150 are displaced by period 148.

Each ridge 150 further includes a ridge crown surface 152 and a second surface. The second surface of each ridge 150 is not visible in the figure. Surface 152 and the second surface of each ridge 150 are essentially parallel planes separated by a ridge thickness 154. Thickness 154 is perpendicular to surface 152 and parallel to thickness 144.

Affixed to surface 152 of each ridge 150 is a deformable reflective conductor 156. Conductor 156 further includes a first reflective surface 158 and a second reflective surface opposite thereof. The second reflective surface of conductor 156 is not visible in the figure. Conductor 156 is shown in an undeformed state in the figure. Surface 158 and the second reflective surface of conductor 156 are separated by a conductor thickness 160. Each electrode 146 and the portion of conductor 156 overlapping the electrode 146 forms a respective capacitive pixel element 162. Conductor 156 further includes a conductor width 157. In an undeformed state width 157 is perpendicular to thickness 144 and period 148.

Electrode 146 of each pixel 162 is electrically connected to an output terminal 164 of a respective drive amplifier 166. An input terminal 168 of each amplifier 166 is electrically connected to a respective output stage of a shift register 170. Requirements for the shift register utilized in my invention will be identified herein. Such configurations are well understood by those knowledgeable in the state of the art and consequently, individual stages are not shown in the figure. An information bearing signal 172 is applied to shift register 170 and a clock circuit 174. Circuit 174 applies a clock signal 176 to register 170. Conductor 156 is maintained at ground potential 108.

System 136 further includes a linear photosensitive array 178 shown in a schematic fashion. Array 178 further includes a plurality of photosensitive elements 180, depicted as photodiodes, displaced by a second period 182. Period 182 is parallel to period 148. Each element 180 further includes an anode terminal 184 and a cathode terminal 186. Terminal 184 of each element 180 are electrically connected by a column buss 188. Buss 188 is electrically connected to a ground terminal 108. Cathode terminal 186 of each element 180 is electrically connected to a input terminal 190 of a respective feedback amplifier 192.

System 136 further includes a schlieren optical subsystem 194. Subsystem 194 further includes a light source 196, a condenser lens 198, a reflective schlieren stop 200 and a schlieren lens 202. Lens 202 is separated from substrate 140 by an object distance 204. Distance 204 is parallel to thickness 144. Lens 202 is separated from array 178 by an image distance 206. Distance 206 is parallel to distance 204. Stop 200 is separated from lens 202 by a simple lens focal length 208. Length 208 is parallel to distance 204. Lens 198 forms an image of source 196 on stop 200. The image of source 196 is not shown in the figure. FIG. 3 is not drawn to scale for convenience. Light rays which diverge from the image of source 196 are collimated by lens 202 and incident on array 138. Since substrate 140 and electrodes 146 are transmissive, the collimated wavefront emanating from lens 202 is incident upon the second reflective surface of conductor 156. The collimated wavefront incident upon the second reflective surface of conductor 156 is not shown in the figure.

Since the second surface of conductor 156 is reflective, the wavefront is reflected by the second surface of conductor 156. Lens 202 forms an image by focusing the portion of the wavefront reflected from each element 162 on a respective element 180. Mapping relationships involving lens 202, pixel elements 162 and elements 180 are well understood by those knowledgeable in the state of the art. As well understood by those knowledgeable in the state of the art, due to the use of a schlieren optical system, the irradiance of the image of each pixel 162 on the respective element 180 is related to the deformation of the portion of the conductor 156 which overlaps the electrode 146 of the pixel element 162. Such relationships are well understood by those knowledgeable in the state of the art.

An output terminal 210 of each amplifier 192 is electrically connected to a feedback terminal 211 of the drive amplifier 166 which has it's output terminal 164 electrically connected to the electrode 146 of the pixel element 162 which is imaged on the photosensitive element 180 which is electrically connected to input terminal 190 of the feedback amplifier 192. Electrically connecting the feedback amplifiers 192 to the drive amplifiers 166 in the manner describes provides a feedback loop for each pixel element 162. Accordingly, the deformation of the portion of the conductor 156 which overlaps the electrode 146 electrically connected to the output terminal 164 of the respective drive amplifier 166 will respond to the input signal at input terminal 168 of each amplifier 166. Varying the input signal at terminal 168 of each amplifier 166 will vary the deformation of a localized portion of conductor 156 thereby phase modulating a wavefront incident on surface 158. The wavefront incident on surface 158 is not shown in the figure for convenience. Due to the feedback signal generated by the element 180 electrically connected to each feedback amplifier 192, the control of the deformations associated with conductor 150 will be enhanced. The feedback configuration around each pixel elements is designed to be a negative feedback loop. Utilization of the information provided herein, such considerations will be readily apparent to those knowledgeable in the state of the art.

FIG. 4 thru FIG. 8 shows time lines associated with the operation of the smart electro-optical system of my invention. FIG. 4 shows the amplitude Vs of signal 172 as a function of time T. Signal 172 is periodic with line period 212. Each period 212 further includes an active interval 214 and a blanking interval 216. Three consecutive period 212 labeled as P=1 to P=3 are shown in FIGS. 4 thru FIGS. 8. FIGS. 4 thru 8 are time phased relative to one another to facilitate interpretation of operation of my invention.

During each active interval 214, signal 172 of FIG. 4 is sampled by the shift register of my invention at sampling instants SA, SB, SC. The shift register is not shown in the figure. Each sampling instant is labeled with the number of the period in which the sample was acquired. The amplitude at each sampling instant SA, SB, SC, is determined by the amplitude Vs of signal 172.

FIG. 5 shows the sample amplitude VC of each sample value SA, SB, SC collected from each period 212 by the shift register. The shift register is not shown in the figure.

FIGS. 6 shows the amplitude VAO of a shift register output signal AO applied to the input terminal of a respective drive amplifier electrically connected to the shift register. The shift register and drive amplifier are not shown in the figure. Signal AO is related to the sample values SA. The shift register architecture is configured so that signal AO applied during each period 212 is a scaled value of the amplitude VC of the sample SA acquired in the active interval 214 of the preceding period 212. Shift register architecture for achieving the desired behavior is well understood by those knowledgeable in the state of the art. See for instance information described in U.S. Pat. No. 4,622,590 to Togashi, Nov. 11, 1986, FIG. 3.

During each period 212, amplitude VAO of signal AO is related to the sample value SA acquired by the shift register during the active interval of the preceding period. FIG. 6 shows the amplitude of a voltage signal 218A which is applied by the output of the amplifier with input AO, to the pixel element electrically connected to the drive amplifier. During each period 212, signal AO is constant. Due to the transfer functions of the components utilized in the feedback loop around the amplifier, signal 218 exhibits certain response characteristics which could include a steady state error &, a settling time TS, and a peak overshoot Mt.

Relationships between the transfer function associated with the loop components, such as the amplifier, and response characteristics of the loop are well understood by those knowledgeable in the state of the art and not shown in detail.

FIG. 7 shows the amplitude VBO of a shift register output signal BO applied to the input terminal of a respective drive amplifier electrically connected to the shift register. The shift register, and drive amplifier are not shown in the figure. Signal BO is related to the sample values SB. The shift register architecture is configured so that signal BO applied during each period 212 is a scaled value of the amplitude VC of the sample value SB acquired in the active interval 214 of the preceding period 212.

FIG. 7 shows how the amplitude of a voltage signal 218B applied to the pixel element connected to the amplifier with input BO varies in response to signal BO. Interpretation of FIG. 7 is similar to what has been previously presented for the description of FIG. 6. The pixel element and drive amplifier are not shown in the figure.

FIG. 8 shows the amplitude VCO of a shift register output signal CO applied to the input terminal of a respective drive amplifier electrically connected to the shift register. The shift register, drive amplifier and drive amplifier input terminal are not shown in the figure. Signal CO is related to the sample values SC. The shift register architecture is configured so that signal CO applied during each period 212 is a scaled value of the amplitude VC of the sample value SC acquired in the active interval 214 of the preceding period 212.

FIG. 8 shows how a voltage signal 218C applied to the pixel element electrically connected to the drive amplifier which signal CO is applied varies in response to signal CO. Interpretation of FIG. 8 is similar to the description previously given for FIG. 6.

As illustrated in the FIGS. 4 thru 8, the shift register applies, in parallel, a respective signal to the input terminal of each amplifier. Due to feedback signals, connected to each amplifier as described in the discussion of FIG. 3, a negative feedback loop exists for each pixel element. Accordingly, the deformation response of the portion of the conductor in each pixel can be made more consistent on a pixel by pixel comparison basis by the use of my invention. Such considerations enhance the desirability of my invention over prior art.

Figure 9:
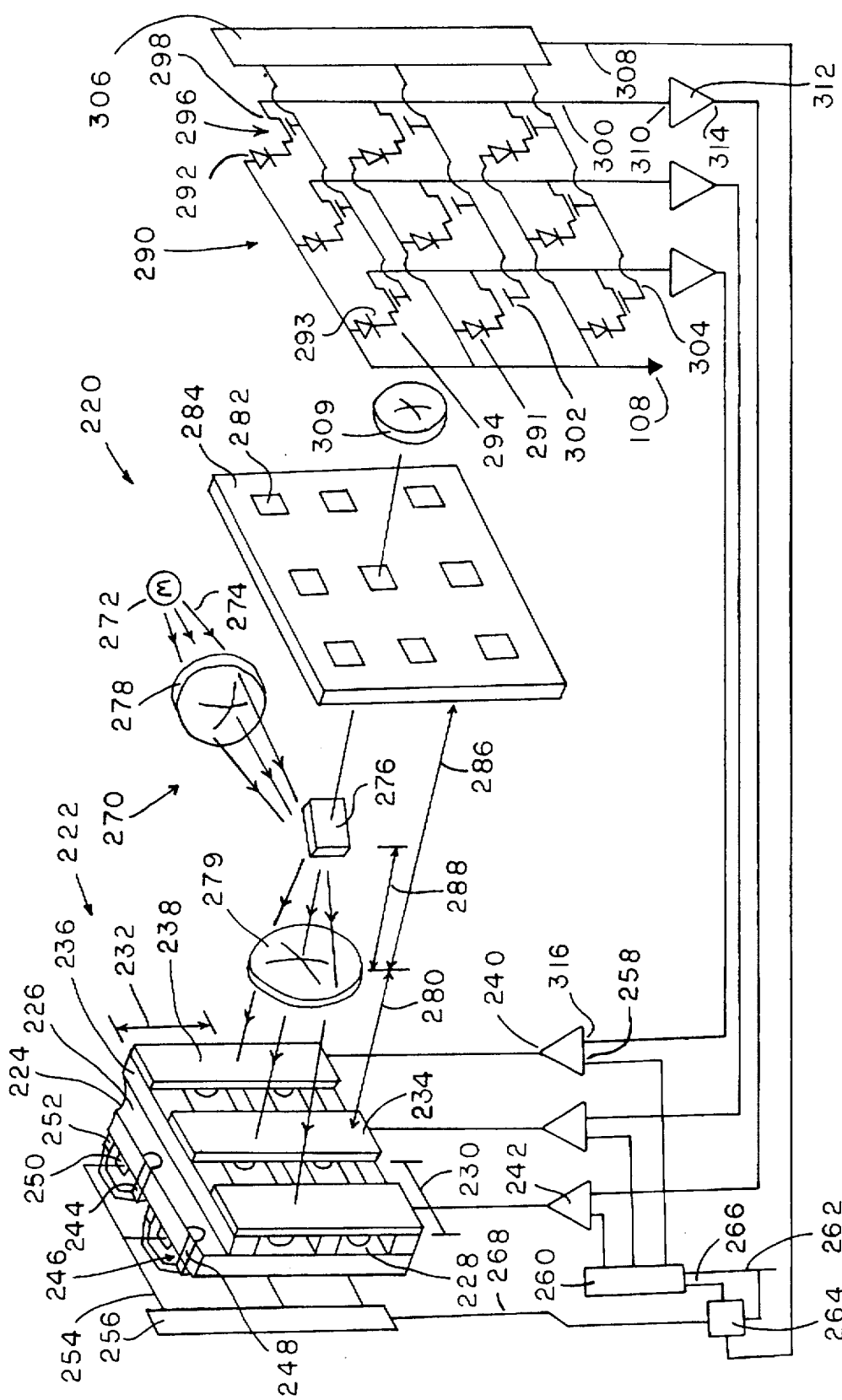
FIG. 9 shows a visual display system utilizing a reflective surface deformation type electrostatic spatial light modulator with an broad band incandescent light source and an electro-optic feedback system.

FIG. 9 shows a two dimensional visual display system 220. Portions of FIG. 10 have been shown cut away and/or removed for clarity. FIG. 9 is not drawn to scale. System 220 further includes a thin film transistor addressed membrane light modulator 222. Modulator 222 further includes an insulating substrate 224. Affixed to a first surface 226 of substrate 224 is a plurality of electrodes 228 arrange into a matrix of p rows and q columns. Adjacent electrodes 228 in each row p are displaced by a first period 230. Adjacent electrodes 228 in each column q are displaced by a second period 232. Overlapping each column q of electrodes 228 is a respective deformable reflective column conductor 234. A plurality of ridges 236 are utilized to affixed the conductors 234 to the substrate 224 and to separate each electrode 228 from the conductor 234 overlapping the electrode 228 thereby forming a plurality of deformable mirror pixel elements 238.

Each column conductor 234 is electrically connected to an output terminal 240 of a respective column drive amplifier 242. Each electrode 228 is electrically connected to a drain electrode 244 of a respective thin film transistor 246 affixed to the second surface of substrate 224 by a feedthrough means 248. The second surface of the substrate is not visible in the figure. Each transistor 246 further includes a gate electrode 250 and a source electrode 252. The gate electrodes 250 of transistors 246 in each row p are electrically connected by a respective row select buss 254. Each buss 254 is electrically connected to a row decoder module 256. The source electrodes 252 of thin film transistors 246 are electrically connected to aground terminal. The interconnection of the source electrodes to the ground terminal is not shown in the figure for convenience. Modulators of the type described herein are fully described in a patent application submitted by Craig D. Engle titled "An Enhanced Electrostatic Shutter Mosaic Modulator" Ser. No. 07/955,058 filed Oct. 1, 1992, of which is officially incorporated herein by reference.

A input terminal 258 of each amplifier 242 is electrically connected to a shift register 260. An information bearing signal 262 is input to shift register 260 and a clock means 264. Means 264 applies a first clock signal 266 to shift register 260 and a second clock signal 268 to row decoder module 256. In the row at a time addressing sequence employed in system 220, signal 262 is sampled by register 260 in response to signal 266 and the samples obtain during one period of signal 262 are then applied, in parallel and in the subsequent period, to input terminal 2 58 of a respective amplifier 242.

Decoder 256 applies in secession, and in synchronism with the operation of shift register 260, due to signal 268, an activation signal to each buss 254 that changes the impedance state of every transistor 246 connected to the activated buss 254 enabling a respective potential different to be applied to each element 238 electrically connected to the activated row p of transistors 246. Operation of the row at a time addressed modulator 222 is described in the references cited herein. Each potential difference is attributed to the difference between the potential applied to the conductor 234 which overlaps the electrode 228 of the respective element 238 in the activated row p, and ground potential. Varying the potential difference applied to each pixel element 238 varies the deformation of the portion of conductor 234 overlapping the electrode 228 of the pixel element 238 thereby phase modulating a wavefront incident thereon.

System 220 further includes a schlieren optical system 270. System 270 further includes a light source 272. Light rays 274 which diverge from source 272 are imaged onto a reflective schlieren stop 276 by a condenser lens 278. Rays 274 which diverge from stop 276 are collimated by a schlieren lens 279 and are incident on modulator 222. Relationships between a wavefront and the rays associated with the wavefront, as the wavefront propagates, are well understood by those knowledgeable in the state of the art. Lens 279 is separated from modulator 222 by an object distance 280. Lens 279 forms a respective pixel image 282 of each pixel element 238 on a transmissive lambertian screen 284. Screen 284 is separated from lens 279 by an image distance 286. Stop 276 is separated from lens 279 by a lens focal length 288. As well understood by those knowledgeable in the state of the art, the irradiance characteristics associated with each pixel image 282 is dependent upon the state of deformation of the portion of the conductor 234 which overlaps the electrode 228 of the pixel element 238. Relationships which govern the variation of separation distance between an electrode and the portion of the conductor overlapping the electrode, as a function of the potential difference applied to the pixel element are well understood by those knowledgeable by those knowledgeable in the state of the art.

System 220 further includes a photosensitive array 290. Array 290 further includes a plurality of photosensitive devices 292, depicted as photodiodes, arranged into a matrix of p rows and q columns. Each device 292 further includes an anode terminal 291 and a cathode terminal 293. Anode terminal 291 of each device 292 is electrically connected to ground terminal 108. Terminal 293 of each device 292 is electrically connected to a first terminal 294 of a respective switching transistor 296. A second terminal 298 of each transistor 296 in each column q is electrically connected to a respective column buss bar 300. A third terminal 302 of every transistor 296 in each row p is electrically connected to a respective row select interconnect 304. Each interconnect 304 is electrically connected to a second row decoder module 306. Clock means 264 applies a synchronization signal 308 to module 306.

An imaging lens 309 images each image 282 onto a respective device 292 of array 290. Due to the periodic nature of system 220, each conductor 234 is imaged onto a respective column q of devices 292. Each bar 300 is electrically connected to an input terminal 310 of a respective feedback amplifier 312. An output terminal 314 of each feedback amplifier 312 is electrically connected to a feedback terminal 316 of the amplifier 242 which is electrically connected to the column conductor 234 which is imaged on the column q of devices 292 which are electrically connected by switching transistors 296 in the column q to bar 300 which is electrically connected to terminal 310 of the amplifier 312.

Module 306 applies in secession, and in synchronization with clock means 264 due to signal 308 a row enable pulse to each interconnect 304 to control the impedance state of every transistor 296 electrically connected to the activated interconnect 304. Clock means 264 ensures that module 306 activates the row of transistors 296 which are electrically connected to the row p of devices 292 which is the image of the row p of pixels elements 238 in modulator 222 which is activated by module 256.

As well understood by those knowledgeable in the state of the art, due to the use of a schlieren optical system, the irradiance associated with each image incident on a respective photosensitive device 292 is related to the deformation of the portion of the conductor 234 of the pixel element 238 which is imaged onto the photosensitive device 292. Accordingly, each device 292 generates an output signal which is related to the deformation characteristics of a respective pixel. Utilizing the interconnect scheme and synchronization signals in the manner described herein allows each device 292 electrically connected to the row p of activated transistors 296 to be electrically connected to input terminal 310 of a respective feedback amplifier 312. This enables system 220 to establish a feedback loop around each pixel element 238 of modulator 222 on a row at a time basis. Characteristics of row at a time feedback for use in two dimensional spatial light modulators for each line period are similar to what has been previously discussed herein. The benefits of such a scheme is that the settling time associated with the pixel response to the applied potential difference is able to the approach the period of the information bearing signal. This latitude facilitates enhancing the performance attainable by electrostatic light modulators. Accordingly, my invention is capable of providing several benefits in color display applications.

Figure 10:
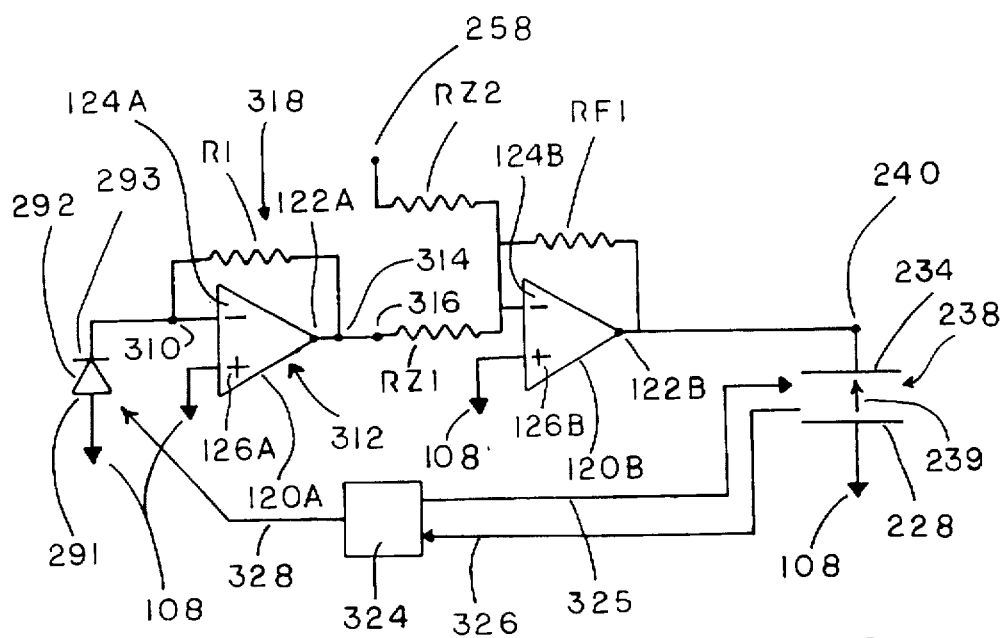
FIG. 10 shows a spatial light modulator system which utilizes an electro-optic feedback control loop.

FIG. 10 shows a single feedback loop 318 which utilizes a photosensitive device 292. Anode terminal 291 of device 292 is electrically connected to ground terminal 108. Cathode terminal 293 of device 292 is electrically connected to input terminal 310 of feedback amplifier 312. Connected between terminal 314 and terminal 310 of amplifier 312 is a feedback resistor labeled as RF. Terminal 314 is electrically connected to terminal 316 of drive amplifier 242. Amplifier 312 further includes an operational amplifier 120A. Amplifier 120A further includes an output terminal 122A electrically connected to terminal 314. Terminal 310 is electrically connected to terminal 124A of amplifier 120A. Terminal 126A of amplifier 120A is electrically connected to ground terminal 108.

Amplifier 242 further includes an op-amp 120B. Amplifier 120B further includes minus terminal 124B, positive terminal 126B, and output terminal 122B. Connected between terminal 124B and terminal 122B is a feedback resistor labeled as RF1. Electrically connected between terminal 124B and terminal 316 is a input resistor labeled as RZ1. Electrically connected between terminal 124B and terminal 258 is a second input resistor labeled as RZ2. Terminal 122B is electrically connected to terminal 240. Output terminal 240 is electrically connected to conductor 234 which overlaps electrode 228 of a respective pixel element 238. Electrode 228 is shown electrically connected to ground terminal 108. Such a condition is representative of an electrode electrically connected to the drain electrode of a transistor which is activated to a low impedance state with the source electrode of the transistor connected to ground potential. Applying a potential difference to element 238 leads to an electric field 239 in element 238. As previously described, varying electric field 239 varies the deformation of conductor 234.

Loop 318 further includes an optical system 324. System 324 generates a wavefront, represented by ray 325, which is incident on conductor 234. A sample of the wavefront reflected by conductor 234, represented by ray 326, is collected by system 324. System 324 generates a image of pixel 238, represented by ray 328, by focusing the wavefront represented by ray 328, on device 292. Such considerations are well understood by those knowledgeable in the state of the art and are not shown in the figure.

A voltage signal appearing at terminal 314 is related to the irradiance of the image incident on device 292 by the relationship identified in equation 2 shown below.

$$Vfb = -(P) \times (SR) \times (R1) \qquad (2)$$

where:

Vfb is the feedback voltage signal appearing at terminal 314. P is the power associated with the irradiance of the pixel image incident on device 292 and is related to the area of the device 292 and the irradiance on device 292. Due to the optical system 324, instantaneous irradiance is related to the instantaneous deformation state of conductor 234 of pixel 238. Accordingly, Vfb is related to the instantaneous state of deformation of conductor 234.

SR is the spectral responsivity of device 292. Due to equation 2 being represented as a simple product of terms, it is inherently assumed that voltage Vfb is attributed to a monochromatic image. Relationships which govern Vfb and a polychromatic irradiance are well understood by those knowledgeable in the state of the art.

Amplifier 242 is a summing amplifier with the pixel drive voltage appearing on output terminal 240 having a defined relationship with the input signal applied to terminal 258 and the feedback signal Vfb applied to terminal 316. The output voltage as a function of the input signal level and the feedback signal is related by the transfer function of the amplifier. Equation 3 shows the relationship among these variable.

$$Vpd=-\{(Vin)\times(RF1/RZ2)+(Vfb)\times(RF1/RZ1)\} \quad (3)$$

Where:

Vpd is the potential difference applied to the pixel element.

Vin is the input voltage.

As well understood by those knowledgeable in the state of the art, in order to insure that the feedback loop is a negative feedback loop, Vin in this configuration is restricted to be of positive polarity.

Characteristics of the optical system 324 which influences the irradiance level of the image on photodiode 292 are well understood by those knowledgeable in the state of the art. Transmission, Clear aperture and focal length of optical components all effect the relationship involving the wavefront reflected from the conductor and the irradiance on the photosensitive device. Additional influences include operating conjugates of the optical system, object distance and/or image distance, and the consequential magnification associated with the system as well as field angles and any cosine dependencies associated with off axis field points. Such considerations are well understood by those knowledgeable in the state of the art, and are not shown in the figure for convenience.

Due to the desire to control the transient response of the conductor, the temporal response of the photosensitive device is an important considerations. Such considerations are well understood by those knowledgeable in the state of the art.

Conclusions, Ramifications, and Scope of Invention:

While my above description contains many specifications, these should not be construed as limitations on the scope of the invention, but rather as an exemplification of one preferred embodiment thereof. Many other variations are possible. More complex control loops may be employed with my invention to allow greater control and/or compensation for non linearities associated with the deformation of the conductor and/or more control over response characteristics. The type and order to the control loop can be varied to vary the performance characteristics of the modulator. This is a distinct advantage of my invention over prior art. Considerations such as the order and type of the feedback control loop transfer function are well understood by those knowledgeable in the state of the art.

The interface components could be thin film components formed on the substrate or discrete interface chips bonded to the substrate. The feedback interconnects have been shown as a parallel buss network. Alternative configurations exist and includes a multiplexer and demultiplexer operating in conjunction with a high speed serial interface interconnecting the feedback array and the modulator array. Considerations, such as sampling frequency to ensure reproducing the transient response are well understood by those knowledgeable in the state of the art.

In addition, alternative feedback transducers may be utilized in my invention. Alternative feedback transducers include piezo-resistive elements affixed to the conductor. The conductor could be reconfigured to utilize a nonconductive membrane and coated with a conductor on surface of the membrane. Such considerations are well understood by those knowledgeable in the state of the art.

The optical system of my invention could utilize a beam splitter to sample the modulated wavefront and to assist in redirecting the sampled wavefront to the feedback transducer. Utilizing the information provided herein, such considerations will be obvious to those knowledgeable in the state of the art.

Accordingly, the scope of the invention should be determined not by the embodiments illustrated, but by the appended claims and their legal equivalents.

I claim:

1. An spatial light modulator comprising:

a substrate, pixel means comprising reflective means offset from said substrate, control means to apply an electric field to said pixel means, feedback means generating a feedback signal dependent on relative position between said reflective means and said substrate, said control means further comprises a summing means synthesizing a definable relationship involving dependency of said electric field on said feedback signal and an input signal applied to said summing means, whereby varying said electric field varies relative position between said reflective means and said substrate thereby modulating a wavefront incident on said reflective means.

2. The device of claim 1, wherein said pixel means further comprises:

first electrode means affixed to said substrate, said reflective means is affixed to said substrate overlapping and separated from said first electrode means, said reflective means is electrically conductive, whereby varying relative position between said reflective means and said substrate varies separation between reflective means and said first electrode means.

3. The device of claim 2 wherein said feedback means further includes capacitance transducer means for generating said feedback signal, said transducer means comprises second electrode means separated from said reflective means, whereby varying relative position between said reflective means and said substrate varies separation between said reflective means and said second electrode means which varies said feedback signal.

4. The device of claim 2 wherein said feedback means comprises an photosensitive element, optical means to generate an image of said reflective means on said photosensitive element.

5. The device of claim 4 wherein said optical means further includes a schlieren optical system enabling an irradiance level associated with said image to be dependent on separation between said reflective means and said first electrode means.

6. The device of claim 5 wherein said wavefront is incident on a first surface of said reflective means, said reflective means further includes a second surface opposite said first surface, said second surface is reflective, said substrate and said first electrode means are transmissive, said schlieren optical system generates a second wavefront which is incident on and traverses said substrate and said first electrode means impinging on and reflected by said second surface of said reflective means to again traverse said first electrode means and said substrate to be focused on said photosensitive element.

7. The device of claim 4 wherein said optical means comprises:

schlieren optical means forming an intermediate image of said reflective means on a viewing screen.

relay lens means to form said image of said reflective means from said intermediate image.

8. A spatial light modulator system comprising:

a substrate.

a plurality of pixel means, each said pixel means comprising: reflective means separated from said substrate.

control means to apply an electric field to each said pixel means.

feedback means operatively associated with each said pixel means generating a respective feedback signal dependent on a relative position between said substrate and said reflective means of the pixel means.

said control means further comprises an amplifier means synthesizing a definable relationship involving dependency of said electric field applied to each said pixel means on said respective feedback signal and a video signal applied to said control means.

whereby varying said electric fields varies said relative position between said substrate and said reflective means of the pixel means thereby modulating a wavefront incident on said reflective means of said pixel means.

9. The device of claim 8 wherein said feedback means comprises capacitance transducer means comprising:

second electrode means operatively associated with each said pixel means separated from said reflective means of the pixel means.

whereby varying said electric field applied to each pixel means varies separation between said second electrode means operatively associated with the pixel means and said reflective means of said pixel means.

10. The device of claim 8 wherein said feedback means comprises a photosensitive means operatively associated with each said pixel means.

optical means to generate an image of said reflective means of each said pixel means on said photosensitive means operatively associated with said pixel means.

11. The device of claim 10 wherein said optical means further includes a schlieren optical system generating an irradiance level associated with said image on said reflective means of each said pixel means dependent on relative position between said substrate and said reflective means of the pixel means.

12. The device of claim 11 wherein said wavefront is incident on a first surface of said reflective means of each said pixel means.

said reflective means of each said pixel means further comprises a second surface opposite said first surface of the reflective means.

said second surface of said reflective means of each said pixel means is reflective.

said substrate is transmissive.

said first electrode means is transmissive.

said schlieren optical system generates a second wavefront which is incident on said substrate and traverses said substrate and said first electrode means impinging on and reflected by said second reflective surface of said reflective means of each said pixel means to again traverse said first electrode means and said substrate to be focused on said photosensitive means operatively associated with said pixel means.

13. The device of claim 11 wherein said optical system further includes a schlieren optical system to form an intermediate image of said reflective means of each said pixel means on a viewing screen.

relay lens means forming said image of said reflective means of each said pixel means from said intermediate image of the reflective means.

14. The device of claim 10 wherein said photosensitive means operatively associated with each said pixel means comprises a respective photosensitive element.

said pixel means are arranged into a matrix of p rows and q columns.

said photosensitive elements are arranged in a matrix of p rows and q columns.

15. The device of claim 14 wherein each said pixel means further comprises:

capacitive means comprising:

first electrode means affixed to said substrate.

said reflective means of the pixel means affixed to said substrate overlapping and separated from said first electrode means of said pixel means.

said reflective means of each said pixel means is electrically conductive.

an electronic switch.

said switch comprises a first terminal electrically connected to said capacitive means of the pixel means and a second terminal.

said control means further comprises:

said pixel means in each column q are electrically connected to a respective amplifier means.

said video signal is applied to a shift register means.

said shift register means applies to each said amplifier means a respective input signal dependent on said video signal.

each said amplifier means applies a first potential to said column q of said pixel means electrically connected to said amplifier means.

decode means enabling said electric field applied to each said pixel means in a select row p to be dependent upon said first potential applied to said column q of pixel means containing the pixel means.

second decode means enabling said feedback signal generated by said photosensitive element operatively associated with each said pixel means in said select row p to be applied to said amplifier means applying said first potential to the column q containing the pixel means.

each said amplifier means synthesizing a definable relationship involving dependency of said first potential on said input signal applied to said amplifier means and the feedback signals applied to said amplifier means.

16. A spatial light modulator comprising:

a substrate.

a plurality of modulator means arranged into a plurality of rows and columns.

each said modulator means comprising:

capacitive pixel means comprising:

first electrode means affixed to said substrate.

reflective conductor means affixed to said substrate overlapping and separated from said first electrode means.

electronic switching means comprising:

a first terminal electrically connected to said pixel means.

a second terminal.

said modulator means in each said column are electrically connected to a respective amplifier means.

each said amplifier means synthesizes a definable relationship involving a potential applied by the amplifier means to the column of said modulator means electrically connected to the amplifier means and an input signal applied to said amplifier means.

potential control means including said amplifier means to apply to said pixel means of each said modulator means a respective potential difference dependent upon said potential applied to the column of said modulator means comprising said pixel means, whereby varying each said potential difference varies separation between said first electrode means and said reflective conductor means of said pixel means thereby modulating a wavefront incident on said reflective conductor means.

17. The device of claim 16 wherein said potential control means further comprises said second terminals of said switching means of said modulator means in each said row are electrically connected to a decode means enabling said potential difference applied to said pixel means of each said modulator means in a select row p to be dependent upon said potential applied to the column of said modulator means comprising the pixel means.

18. The device of claim 17 wherein said potential control means further comprises shift register means to relate said input signal applied to each said amplifier means to a video signal applied to said shift register means.

said switching means of each said modulator means comprises a third terminal.

19. The device of claim 18 wherein said switching means of each said modulator means comprises a transistor, said control means further comprises:

feedback means comprising a respective photosensitive element operatively associated with each said modulator means generating a feedback signal dependent upon separation between said first electrode means and said reflective conductor means of said pixel means of the modulator means, second decode means enabling said feedback signal generated by said photosensitive element operatively associated with each said modulator means in said select row p to be applied to said amplifier means electrically connected to the column containing the modulator means.

said definable relationship of each said amplifier means further includes relating said first potential to said feedback signals applied to said amplifier means.

20. A spatial light modulator comprising:

a substrate, a plurality of modulator means arranged into a plurality of rows and columns.

each said modulator means comprising:

capacitive pixel means comprising:
first electrode means affixed to said substrate,
reflective conductor means affixed to said substrate overlapping and separated from said first electrode means, a transistor comprising:
a first terminal electrically connected to said pixel means,
a second terminal,
a third terminal, said modulator means in each said column are electrically connected to a respective amplifier means, each said amplifier means synthesizes a definable relationship involving an output potential applied by the amplifier means to said modulator means electrically connected to said amplifier means and an input signal applied to said amplifier means, shift register means relating said input signal applied to each amplifier means with a video signal applied to said shift register means, said third terminal of said transistor of each said modulator means is electrically connected to a reference potential.

said second terminals of said transistors of said modulator means in each said row are electrically connected to a row decoder means thereby enabling a respective potential difference to be applied to said pixel means of each said modulator means in a select row dependent upon the output potential applied to said modulator means and said reference potential.

feedback means comprising a respective photosensitive element operatively associated with each said modulator means generating a feedback signal dependent upon separation between said first electrode means and said reflective conductor means of said pixel means of the modulator means, second decode means enabling said feedback signal generated by said photosensitive element operatively associated with each said modulator means in said select row p to be applied to said amplifier means electrically connected to the modulator means.

said definable relationship synthesized by each said amplifier means further comprises relating said output potential to said feedback signals applied to said amplifier means, whereby varying each said potential difference varies separation between said first electrode means and said reflective conductor means of said pixel means thereby modulating a wavefront incident on said reflective conductor means.

* * * * *